(12) United States Patent
Funnell et al.

(10) Patent No.: US 8,078,144 B2
(45) Date of Patent: Dec. 13, 2011

(54) APPARATUS AND METHOD FOR APPLYING CIPHERING IN UNIVERSAL MOBILE TELECOMMUNICATIONS SYSTEM

(75) Inventors: Nicola M. Funnell, Warwickshire (GB); Andrew Farnsworth, Worchestershire (GB)

(73) Assignee: Research In Motion Limited, Waterloo (CA)

( * ) Notice: Subject to any disclaimer, the term of this patent is extended or adjusted under 35 U.S.C. 154(b) by 1019 days.

(21) Appl. No.: 11/965,251

(22) Filed: Dec. 27, 2007

(65) Prior Publication Data

US 2008/0130892 A1 Jun. 5, 2008

Related U.S. Application Data

(63) Continuation of application No. 10/903,853, filed on Jul. 30, 2004, now Pat. No. 7,333,442.

(51) Int. Cl.
*H04M 1/66* (2006.01)

(52) U.S. Cl. ........ 455/410; 455/411; 455/418; 380/278; 370/328

(58) Field of Classification Search .................. 455/410, 455/411, 418; 380/278; 370/328
See application file for complete search history.

(56) References Cited

U.S. PATENT DOCUMENTS

| | | | | |
|---|---|---|---|---|
| 6,081,601 A | * | 6/2000 | Raivisto | 380/270 |
| 2005/0226423 A1 | * | 10/2005 | Li et al. | 380/278 |
| 2007/0253401 A1 | * | 11/2007 | Jiang | 370/350 |

* cited by examiner

*Primary Examiner* — Danh Le

(57) ABSTRACT

Apparatus and a method for ciphering messages in mobile telecommunications system user equipment are disclosed. The apparatus is arranged to receive ciphering configuration parameters in a Radio Resource Control (RRC) layer; forward ciphering configuration parameters to a Radio Link Control (RLC) or Medium Access Control (MAC) layer; and, in response to subsequent receipt of a message from the network, which message indicates that the user equipment device is to start ciphering, configuring the user equipment device to start ciphering using the ciphering configuration parameters in the RLC/MAC layer.

11 Claims, 6 Drawing Sheets

APPARATUS AND METHOD FOR APPLYING CIPHERING IN UNIVERSAL MOBILE TELECOMMUNICATIONS SYSTEM

CROSS-REFERENCE TO RELATED APPLICATION

The present application is a continuation application of co-pending patent application Ser. No. 10/903,853 filed on Jul. 30, 2004.

BACKGROUND

Technical Field

This application relates to mobile telecommunications systems in general, having particular application in UMTS (Universal Mobile Telecommunications System) in general, and in particular to an apparatus and method for applying ciphering in universal mobile telecommunications system.

DESCRIPTION OF THE RELATED ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v.3.15.0, referred to herein as the 25.331 specification, addresses the subject of UMTS RRC (Radio Resource Control) protocol requirements between the UMTS Terrestrial Radio Access Network (UTRAN) and the UE.

In a UMTS UE each radio bearer (including signalling radio bearers) may be configured to apply ciphering to all data as part of the security features of UMTS. Ciphering refers to the encryption or decryption of a ciphering unit (a Packet Data Unit (PDU) or Service Data Unit (SDU)). The 25.331 standard states in section 8.6.3.4 that, at any given time, the UE needs to store at most two different ciphering configurations (keyset and algorithm) per Core Network (CN) domain at any given time in total for all radio bearers and three configurations in total for all signalling radio bearers.

To turn on ciphering in the UE, the UTRAN sends a message (for example a SECURITY MODE CONTROL message as set out in section 8.1.12 of the 25.331 standard) to the UE. On receiving the message, the UE must configure each Radio Bearer belonging to the Core Network (CN) domain with the ciphering configuration. This consists of sending: the Hyper Frame Number (HFN); key; algorithm; and activation time to each Radio Bearer. After this information has been transferred, the UE is able to respond back to the UTRAN (for example with a SECURITY MODE COMPLETE message) informing it that the UE is ready to start ciphering.

The time it takes the UE to respond to the UTRAN request is dependant on how quickly the UE is able to configure the Radio Bearers and will impact on how quickly the system is able to start ciphering and hence apply security protection to the data.

There are proposed strategies for dealing with ciphering configurations. A number of such strategies are detailed below.

Other aspects and features of the present invention will become apparent to those ordinarily skilled in the art upon review of the following description of specific embodiments of an apparatus and method for applying ciphering in mobile telecommunications system user equipment.

BRIEF DESCRIPTION OF THE DRAWINGS

Embodiments of the present invention will now be described, by way of example only, with reference to the attached drawings, in which.

The same reference numerals are used in different figures to denote similar elements.

DETAILED DESCRIPTION OF THE DRAWINGS

An apparatus and method for applying ciphering in universal mobile telecommunications system user equipment is described. In the following description, for the purposes of explanation, numerous specific details are set forth in order to provide a thorough understanding of the present invention. It will be apparent, however, to one skilled in the art that the present invention may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for applying ciphering in a mobile telecommunications system, the system comprising a network of a plurality of cells and at least one user equipment device. In one aspect, the method comprises, in the user equipment, receiving ciphering configuration parameters in a first layer (e.g. a control plane such as the physical layer (the Radio Resource Control (RRC) layer) of a UMTS device). The ciphering configuration parameters are forwarded to a second layer (e.g. in a data link layer such as the Radio Link Control Layer (RLC) or Medium Access Control (MAC) layer of a UMTS device). Subsequently, on receipt of a message from the network, which message indicates that the user equipment device is to start ciphering, and in response to receiving the message from the network, the user equipment device is configured to start ciphering using the ciphering configuration parameters in the second layer.

In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices.

Figure 1:
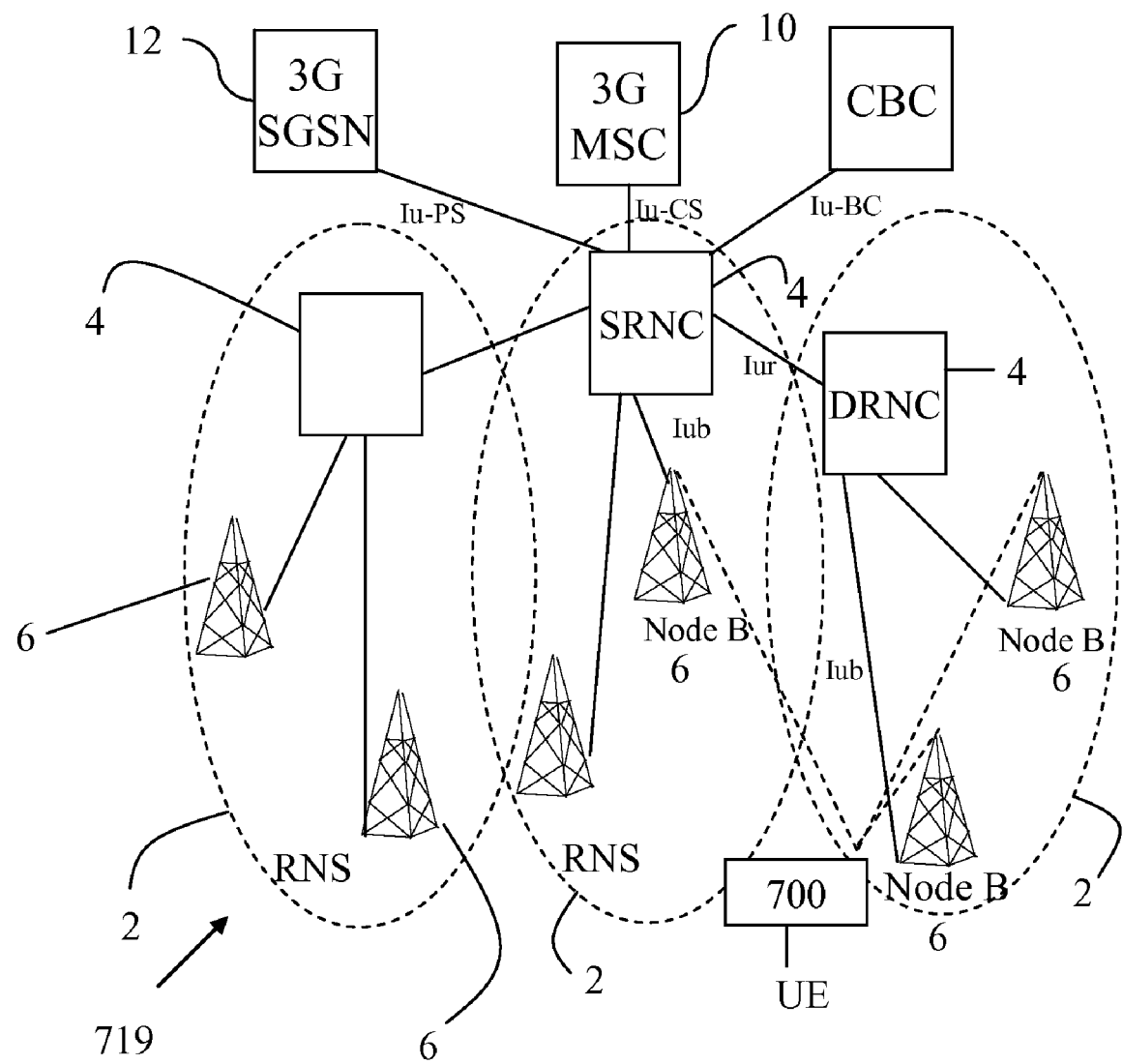
FIG. 1 is an overview of a mobile telecommunications system.

Referring to the drawings, FIG. 1 shows an overview of a network and a UE device. Clearly in practice there may be many UE devices operating with the network but, for the sake of simplicity, FIG. 1 only shows a single UE device 700. For the purposes of illustration, FIG. 1 also shows a network 719 having a few components. It will be clear to a person skilled in the art that in practice a network will include far more components than those shown.

FIG. 1 shows an overview of the radio access network 719 (UTRAN) used in a UMTS system. The network 719 as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 700 may be mobile within the radio access network. Radio connections (indicated by the straight dotted lines in FIG. 1) are established between the UE and one or more of the Node Bs in the UTRAN.

The radio network controller controls the use and reliability of the radio resources within the RNS 2. Each RNC may also connected to a 3G mobile switching centre 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 6 may operate as more than one cell since it may operate at multiple frequencies and/or with multiple scrambling codes.

The UE 700 is configured to store ciphering configurations (for instance, current, old, new) and their associated parameters.

Figure 2:
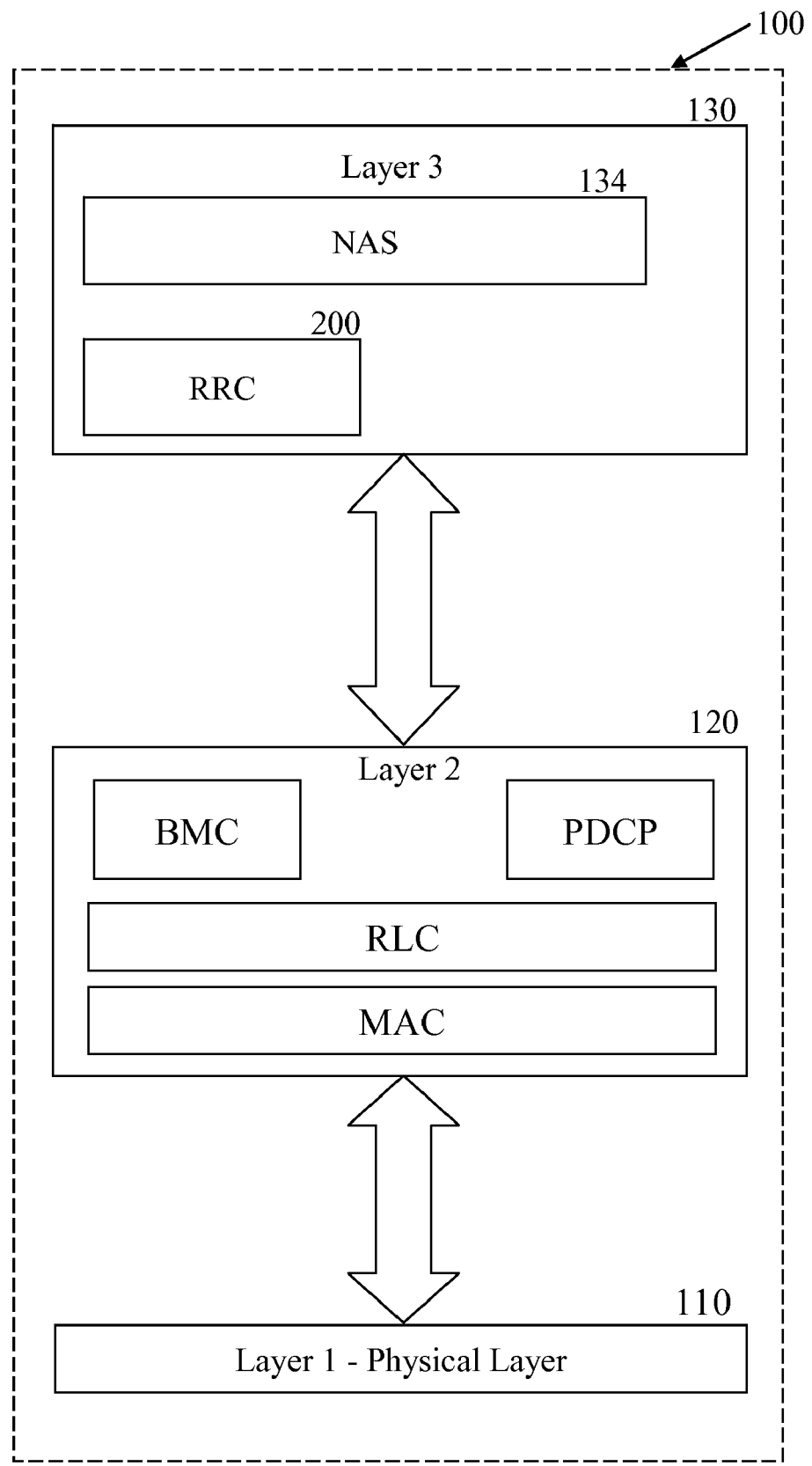
FIG. 2 is a block diagram illustrating an embodiment of a protocol stack apparatus provided with a RRC block, in accordance with the present application.

Referring to the drawings, FIG. 2 is a block diagram illustrating an embodiment of a protocol stack apparatus provided with a RRC block, in accordance with the present application.

The RRC block 200 is a sub layer of Layer 3 130 of a UMTS protocol stack 100. The RRC 200 exists in the control plane only and provides an information transfer service to the non-access stratum NAS 134. The RRC 200 is responsible for controlling the configuration of radio interface Layer 1 (the physical layer) 110 and Layer 2 (the data link layer) 120. Layer 2 includes the Radio Link Control (RLC) sublayer, which comprises RLC entities, and the Medium Access Control (MAC) layer, which comprises MAC entities. Each RLC or MAC entity uses one or more logical channels to send or receive data Packet Data Units (PDUs) and Service Data Units (SDUs). The RLC ciphers units received from higher layers before they are transmitted via lower layers (e.g. Layer 1) and ciphers units received from lower layers before they are passed to higher layers (e.g. Layer 3) for Acknowledged Mode (AM) and Unacknowledged Mode (UM) Radio Bearers (RBs). The MAC ciphers PDUs and SDUs for Transparent Mode (TM) Radio Bearers.

When the UTRAN wishes to change the UE configuration it will issue a message to the UE containing a command to invoke a specific RRC procedure. The RRC 200 layer of the UE decodes this message and initiates the appropriate RRC procedure. When the procedure has been completed (either successfully or not) then the RRC may send a response message to the UTRAN (via the lower layers) informing the UTRAN of the outcome. However, in many cases the RRC need not and does not reply.

The RRC block 200 can implement several different behaviour strategies for implementing ciphering of messages.

Figure 3:
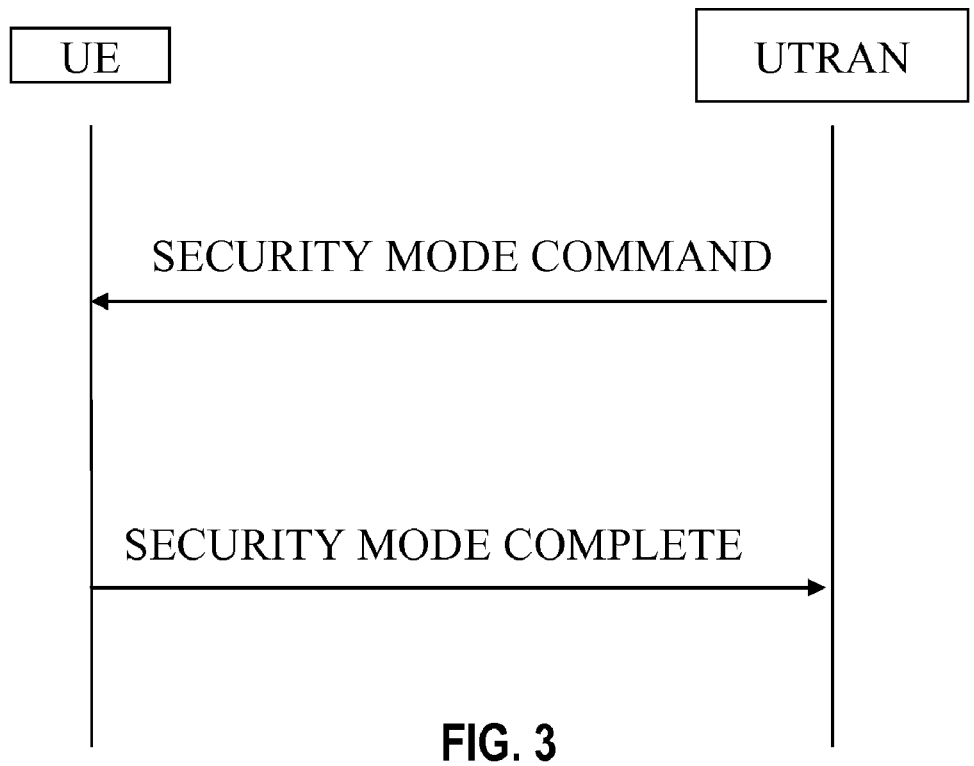
FIG. 3 illustrates security mode control procedure in a UMTS system.

FIG. 3 illustrates security mode control procedure in a UMTS system. The UTRAN sends a SECURITY MODE COMMAND to the UE which then configures each Radio Bearer for ciphering. When this is complete the UE sends a SECURITY MODE COMPLETE message to the UTRAN.

Figure 4:
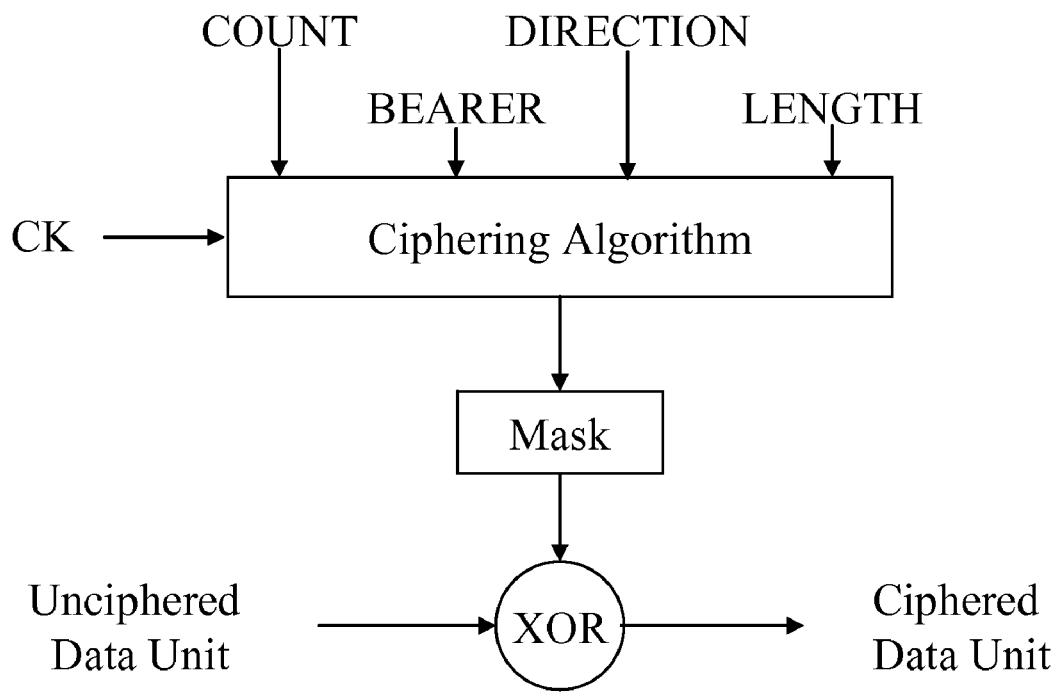
FIG. 4 is a flow diagram illustrating operation of an embodiment of user equipment.

The ciphering configuration parameters for ciphering according to the 25.331 standard are set out in TS 33.102 v.3.13.0. For example as described in section 6.6.3 of 33.102 and as shown in FIG. 4, the UMTS parameters are:

CK—the ciphering key. This is established between the UE and the SRNC during an authentication phase and then is generally stored in the USIM (Universal mobile telecommunications system Subscriber Identity Module).

COUNT—comprising a long sequence number known as the Hyper Frame Number (HFN) and a short sequence number. The HFN in initialised by the UE and signalled to the SRNC before ciphering is started. When a new Radio Access Bearer/logical channel is created during a RRC connection, the highest HFN value currently in use is incremented and used as an initial value for the ciphering sequence of the new logical channel.

BEARER—This indicates the Radio Bearer identity and is unique within an RRC connection. It is used as an input to the ciphering algorithm to ensure that the same ciphering mask is not applied to more than one logical channel having the same CK and the same COUNT. Each logical channel is ciphered independently.

DIRECTION—indicates uplink or downlink

LENGTH—indicates the length of the keystream block (mask) to be generated by the algorithm. It is not an input to the keystream generation function and is determined at the time of ciphering depending on the length of the data to be ciphered.

ALGORITHM—this is the ciphering algorithm to use and is generally specified in the Security Mode Command message. In UMTS, two ciphering algorithms are defined uea0 and uea1.

Some of the ciphering configuration parameters are already known to the UE before the reception of the UTRAN message to start ciphering (e.g. SECURITY MODE COMMAND). The HFN tends to be known (since it does not change for a RB until after ciphering is started), and in most cases the key CK will be known in the UE. BEARER and DIRECTION are determined from the message to set up a Radio Bearer. However COUNT and the ALGORITHM (and the associated activation time) tend not to be known in advance and are indicated in the message from the UTRAN to start ciphering.

The known ciphering configuration parameters (e.g. CK, BEARER, DIRECTION) are sent from the network layer (layer 3) to the data link layer (layer 2) before receipt of a message from the UTRAN to start ciphering. Thus, in one embodiment, the known ciphering configuration parameters are sent from the RRC layer to the RLC or MAC layer before receipt of a message from the UTRAN to start ciphering.

By sending these ciphering parameters to the data link layer (i.e. to each Radio Bearer) after or during its setup, but before the message to start ciphering, the amount of time taken to initiate ciphering in the UE is reduced.

Figure 5:
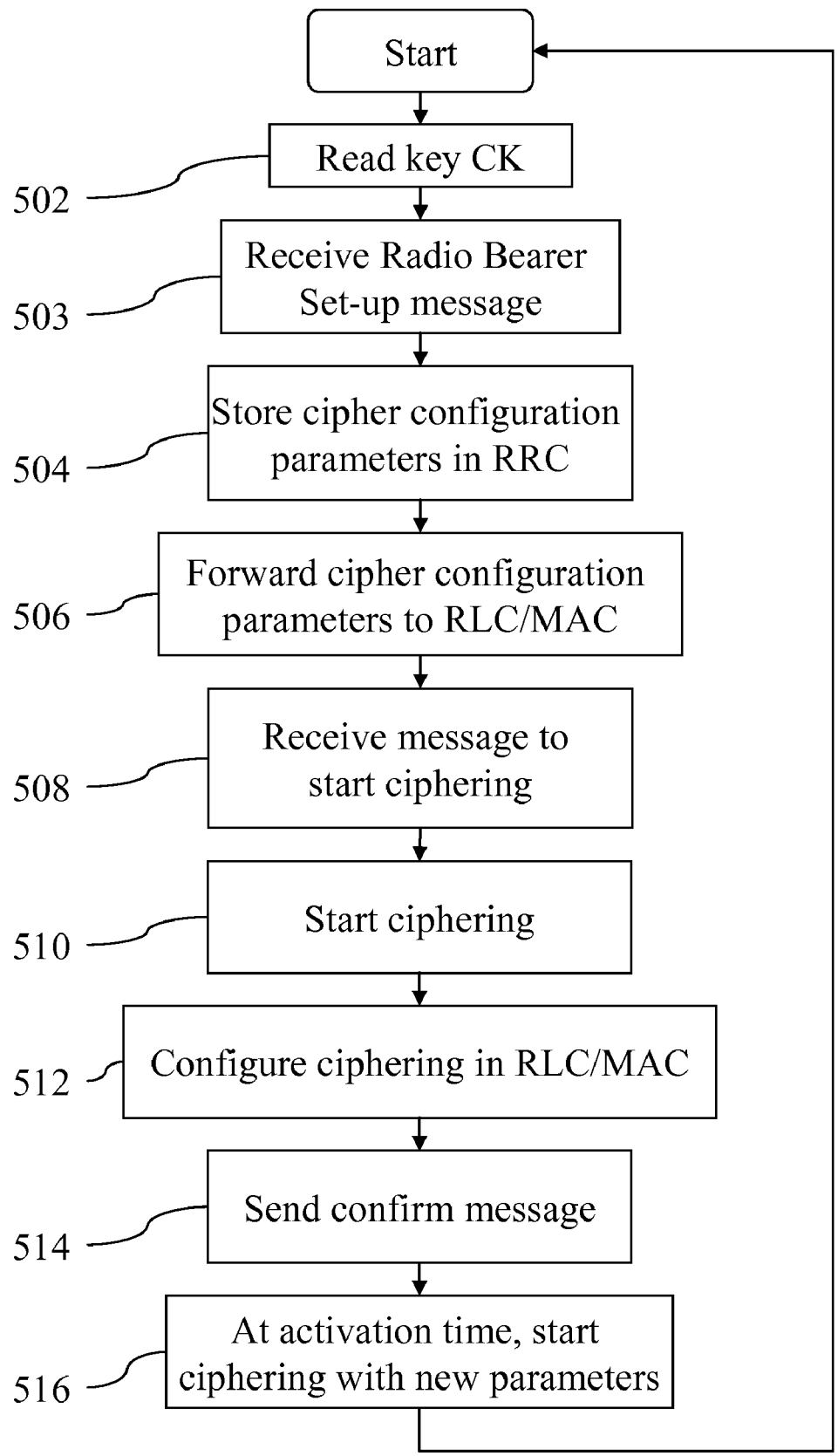
FIG. 5 is a flow diagram illustrating management of ciphering configurations in user equipment.

FIG. 5 is a flow diagram illustrating an example of the operation of one embodiment of a UE. At the start, the UE, at step 502, reads the key CK from the USIM of the device. The UE then receives a message from the UTRAN which message includes some ciphering configuration parameters. In UMTS, this message may for example be a Radio Bearer Set-up message, which is used to set-up Radio Bearers or Signalling Radio Bearers. The ciphering configuration parameters generally include: BEARER and DIRECTION. The HFN is also known at this stage which allows the COUNT to be determined according to section 8.5.8 of the 25.331 standard. The receipt of a message which includes ciphering configuration parameters (e.g. a Radio Bearer Set-up message) acts as a trigger to send ciphering parameters to layer 2.

At step 504, the UE stores the ciphering configuration parameters (e.g. BEARER, DIRECTION, COUNT, CK) in the RRC sublayer of layer 3 and also forwards them to the RLC or MAC sublayer of lower layer 2, step 506, in advance of enabling the ciphering. When the UE subsequently receives a message from the UTRAN to start ciphering, at step 508, (e.g. a Security Mode Command message) the UE then starts ciphering, step 510, using the ciphering configuration parameters stored in the RLC/MAC layer. Any parameters that were included in the message to start ciphering (e.g. the Security Mode Command message) received from the UTRAN are then passed to the layer 2 (RLC or MAC) for future ciphering. Such ciphering parameters included in a Security Mode Command message as defined in section 10.2.43 and 10.3.3.5 of the 25.331 standard include ALGORITHM, activation time for DPCH and Radio Bearer downlink ciphering activation time information. A new key CK may also be sent at this time.

The UE then configures the layer 2 using the ciphering parameters included in the Security Mode Command message, step 512, and when it has done so it sends a confirmation message that this has been completed, step 514. In UMTS this message is defined as a Security Mode Complete message. At the activation time specified in the Security Mode Command message, the UE then implements the new ciphering configuration, step 516.

Thus ciphering parameters received in a Radio Bearer Set-up message, step 503, are sent to layer 2 (RLC or MAC depending on the mode), step 506, before they are needed i.e. before a message is received (e.g. a Security Mode Command message) indicating that ciphering is to be applied, step 508. This means that when the message to start ciphering is received, step 508, the layer 2 already has some of the ciphering parameters necessary and therefore ciphering may be applied in a shorter time.

Thus ciphering configuration parameters are forwarded to the layer that makes use of them (e.g. the RLC or MAC layer) when they are received rather than waiting until they are needed by that layer.

Figure 6:
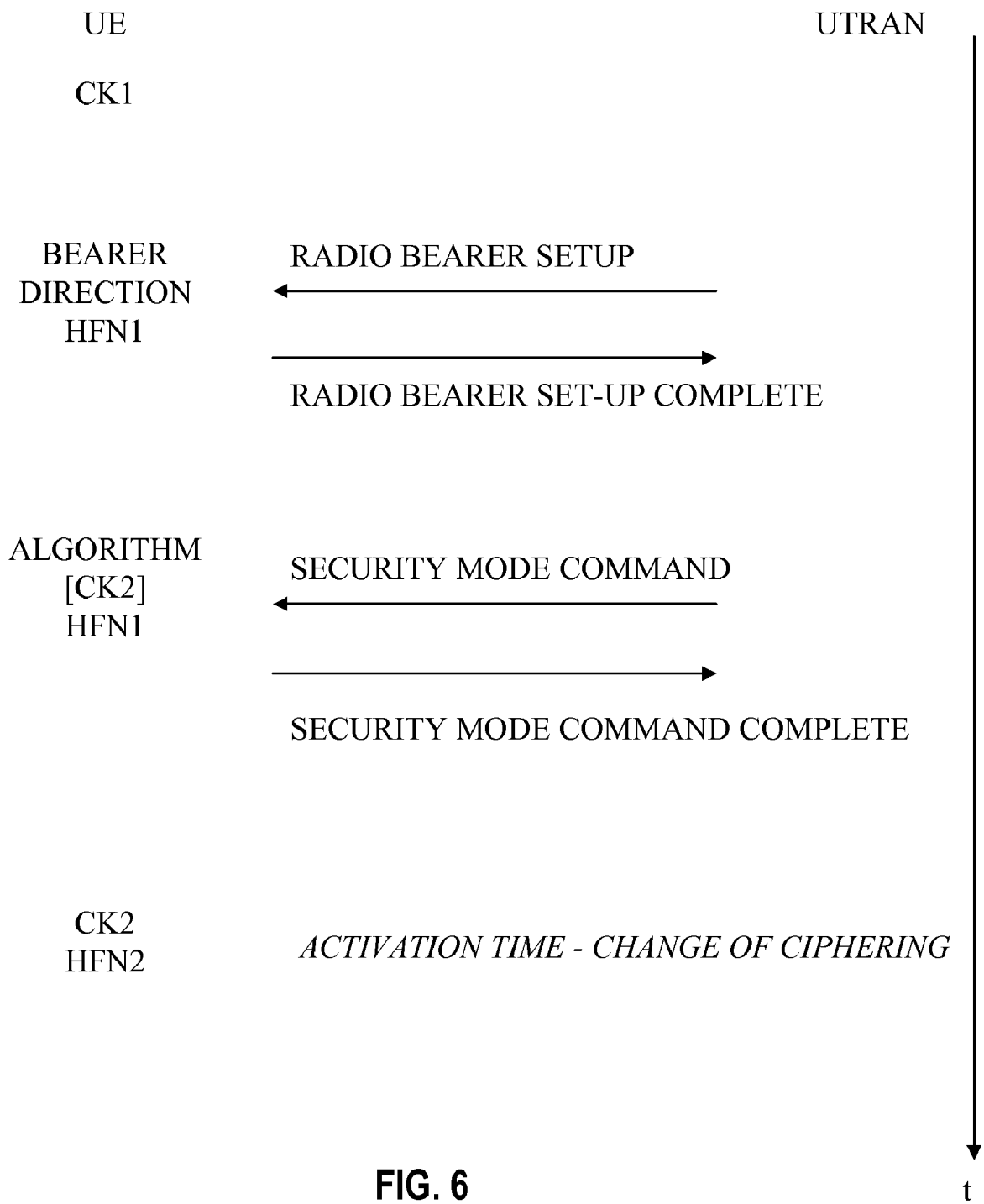
FIG. 6 is a schematic timing diagram illustrating ciphering.

FIG. 6 is a schematic timing diagram of the messages sent between the UTRAN and the UE, the ciphering parameters stored at the UE and the operation of the UE at the activation time for ciphering. At the outset, the UE is shown as having the key CK1. On receipt of a Radio Bearer Set-up message the UE also knows the ciphering parameters BEARER, DIRECTION AND HFN1 (the HFN at that time). When the Radio Bearer has been set up the UE then sends a Radio Bearer Set-up Complete message to the UTRAN, which message includes HFN1. The ciphering parameters are forwarded to the layer that will use them (e.g. layer 2) as discussed above.

Some time later, the UE receives a Security Mode Command message which indicates that the UE is to start ciphering PDUs. The UE now knows further ciphering parameters, for instance ALGORITHM, a new key CK2 (if transmitted by the UTRAN) and HFN2 (the HFN to be used at the activation time). Once the security mode is set up by the UE, the UE then sends a Security Mode Command Complete message to the UTRAN.

At the activation time, the UE and the UTRAN change the ciphering configuration using the ciphering parameters CK2 (if appropriate) and an appropriate HFN. If CK2 was not sent, CK1 is used at the activation time.

Figure 7:
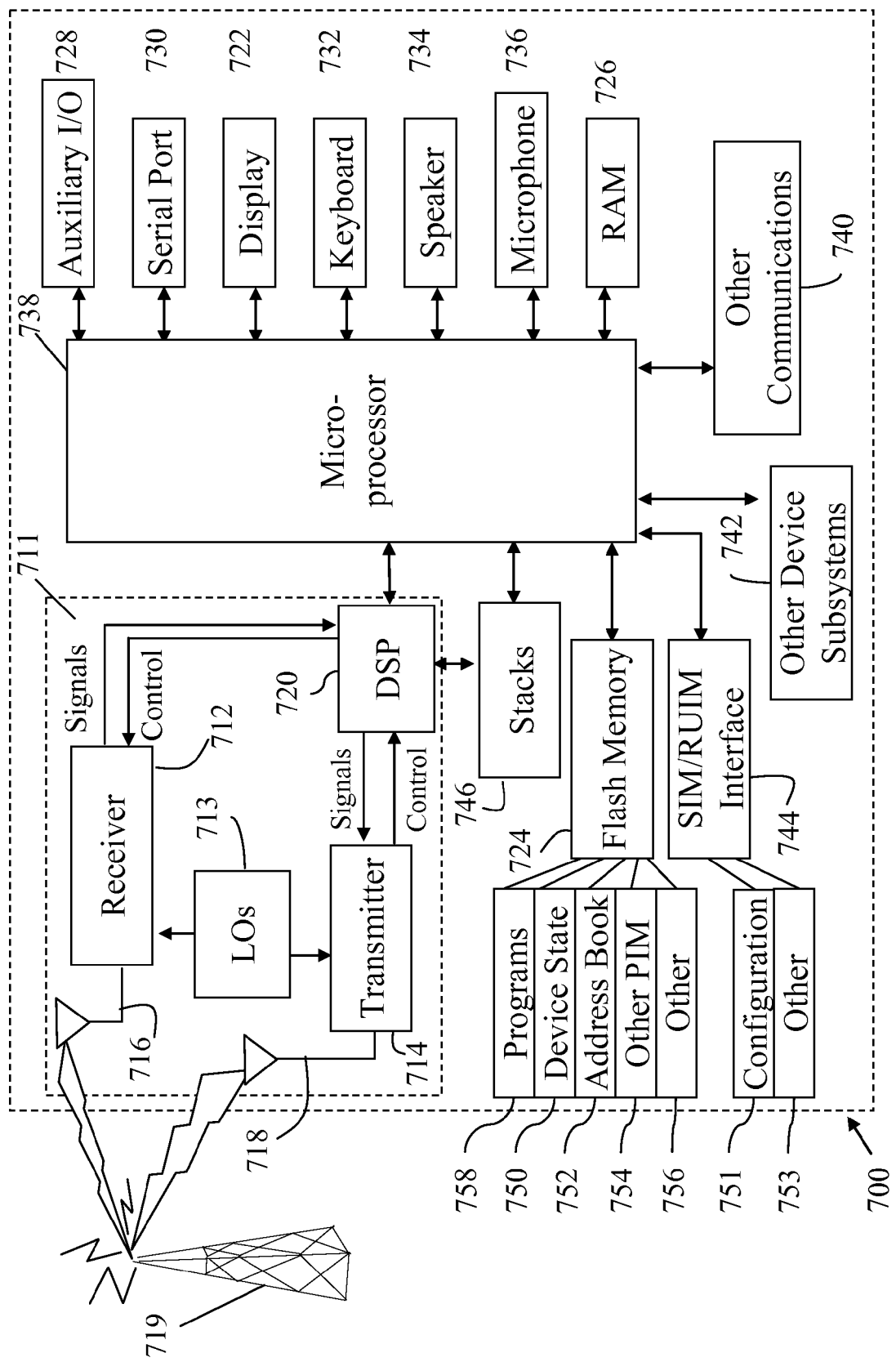
FIG. 7 is a block diagram illustrating a mobile device, which can act as a UE and co-operate with the apparatus and methods of FIGS. 1 to 6.

Turning now to FIG. 7, FIG. 7 is a block diagram illustrating a mobile device, which can act as a UE and co-operate with the apparatus and methods of FIGS. 1 to 5, and which is an exemplary wireless communication device. Mobile station 700 is preferably a two-way wireless communication device having at least voice and data communication capabilities. Mobile station 700 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, mobile station 700 may include a communication subsystem 711 designed to operate within the Mobitex™ mobile communication system, the DataTAC™ mobile communication system, GPRS network, UMTS network, or EDGE network.

Network access requirements will also vary depending upon the type of network 702. For example, in the Mobitex and DataTAC networks, mobile station 700 is registered on the network using a unique identification number associated with each mobile station. In UMTS and GPRS networks, however, network access is associated with a subscriber or user of mobile station 700. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 700 will be unable to carry out any other functions involving communications over the network 702. The SIM interface 744 is normally similar to a card-slot into which a SIM card can be inserted and ejected like a diskette or PCMCIA card. The SIM card can have approximately 64K of memory and hold many key configuration 751, and other information 753 such as identification, and subscriber related information.

When required network registration or activation procedures have been completed, mobile station 700 may send and receive communication signals over the network 702. Signals received by antenna 716 through communication network 702 are input to receiver 712, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 702 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile station 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, a short-range communications subsystem 740 and any other device subsystems generally designated as 742.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile station. A predetermined set of applications that control basic operations, including at least data and voice communication applications for example, will normally be installed on mobile station 700 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 702. In a preferred embodiment, the PIM data items are seamlessly integrated, synchronized and updated, via the wireless network 702, with the mobile station user's corresponding data items stored or associated with a host computer system. Further applications may also be loaded onto the mobile station 700 through the network 702, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile station 700.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of mobile station 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile station 700 is similar, except that received signals would preferably be output to a speaker 734 and signals for transmission would be generated by a microphone 736. Alternative voice or audio I/O subsystems, such as a voice message recording subsystem, may also be implemented on mobile station 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7, would normally be implemented in a personal digital assistant (PDA)-type mobile station for which synchronization with a user's desktop computer (not shown) may be desirable, but is an optional device component. Such a port 730 would enable a user to set preferences through an external device or software application and would extend the capabilities of mobile station 700 by providing for information or software downloads to mobile station 700 other than through a wireless communication network. The alternate download path may for example be used to load an encryption key onto the device through a direct and thus reliable and trusted connection to thereby enable secure device communication.

Other communications subsystems 740, such as a short-range communications subsystem, is a further optional component which may provide for communication between mobile station 700 and different systems or devices, which need not necessarily be similar devices. For example, the subsystem 740 may include an infrared device and associated circuits and components or a Bluetooth™ communication module to provide for communication with similarly enabled systems and devices.

When mobile device 700 is used as a UE, protocol stacks 746 include apparatus and a method for handling messages that relate to a cell other than the currently operating cell in universal mobile telecommunications system user equipment.

Extensions and Alternatives

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of the evaluation is immaterial with respect to the operation of the method, except where specifically stated. The ordering of the steps as described herein is not intended to be limiting, except where specifically stated.

It is also to be noted that where a method has been described it is also intended that protection is also sought for a device arranged to carry out the method and where features have been claimed independently of each other these may be used together with other claimed features.

What we claim is:

1. A method for applying ciphering in a user equipment (UE), the UE configurable to be operable in a wireless telecommunications system, the method comprising, in the user equipment:
   receiving ciphering configuration parameters in a first layer;
   in response to receiving the ciphering configuration parameters, forwarding ciphering configuration parameters to a second layer;
   receiving, after the ciphering configuration parameters have been forwarded to the second layer, an indication to start ciphering; and
   using, after receiving the indication to start ciphering, the ciphering configuration parameters in the second layer.

2. The method of claim 1 further comprising receiving the ciphering configuration parameters in a network layer and forwarding the ciphering configuration parameters to a data link layer.

3. The method of claim 1 further comprising receiving the ciphering configuration parameters in the Radio Resource Control layer and forwarding the parameters to one of: the Radio Link Control layer or the Medium Access Control layer.

4. The method of claim 1 wherein the ciphering configuration parameters forwarded to the second layer comprises at least one of the following: Hyper Frame Number, ciphering key, bearer or direction.

5. The method of claim 1 further comprising:
   receiving at least one further ciphering configuration parameter with the indicator to start ciphering;
   forwarding the at least one further ciphering configuration parameter to the second layer.

6. A user equipment (UE) device configurable for use in a mobile telecommunications system, comprising:
   at least a first layer and a second layer in a protocol stack component, wherein the first layer is configured to receive ciphering configuration parameters and to enable the ciphering configuration parameters to be forwarded to the second layer in response to receiving the ciphering configuration parameters; and
   a receiver configured to receive a message indicating the UE is to start ciphering, where the ciphering will make use of the ciphering configuration parameters previously forwarded to the second layer.

7. The UE of claim 6 where the first layer is a network layer, and the second layer is a data link layer.

8. The UE of claim 6 where the first layer is the Radio Resource Control layer and the second layer is one of: the Radio Link Control layer or the Medium Access Control layer.

9. The UE of claim 6 wherein the ciphering configuration parameters forwarded to the second layer comprises at least one of the following: Hyper Frame Number, ciphering key, bearer or direction.

10. The UE of claim 6 where the first layer is further configured to forward, received as part of the start ciphering message, at least one further ciphering configuration parameter to the second layer.

11. A computer-readable medium carrying one or more sequences of instructions for applying ciphering in a user equipment (UE), the UE configurable for use in a telecommunications system, instructions to enable actions when executed in the UE, the actions comprising:
   receiving ciphering configuration parameters in a first layer;
   in response to receiving the ciphering configuration parameters, forwarding ciphering configuration parameters to a second layer;
   receiving, after the ciphering configuration parameters have been forwarded to the second layer, an indication to start ciphering; and
   using, after receiving the indication to start ciphering, the ciphering configuration parameters in the second layer.

\* \* \* \* \*